July 6, 1965
T. C. GIFFORD
3,193,033
MEASURING DISPENSER
Filed Dec. 26, 1962
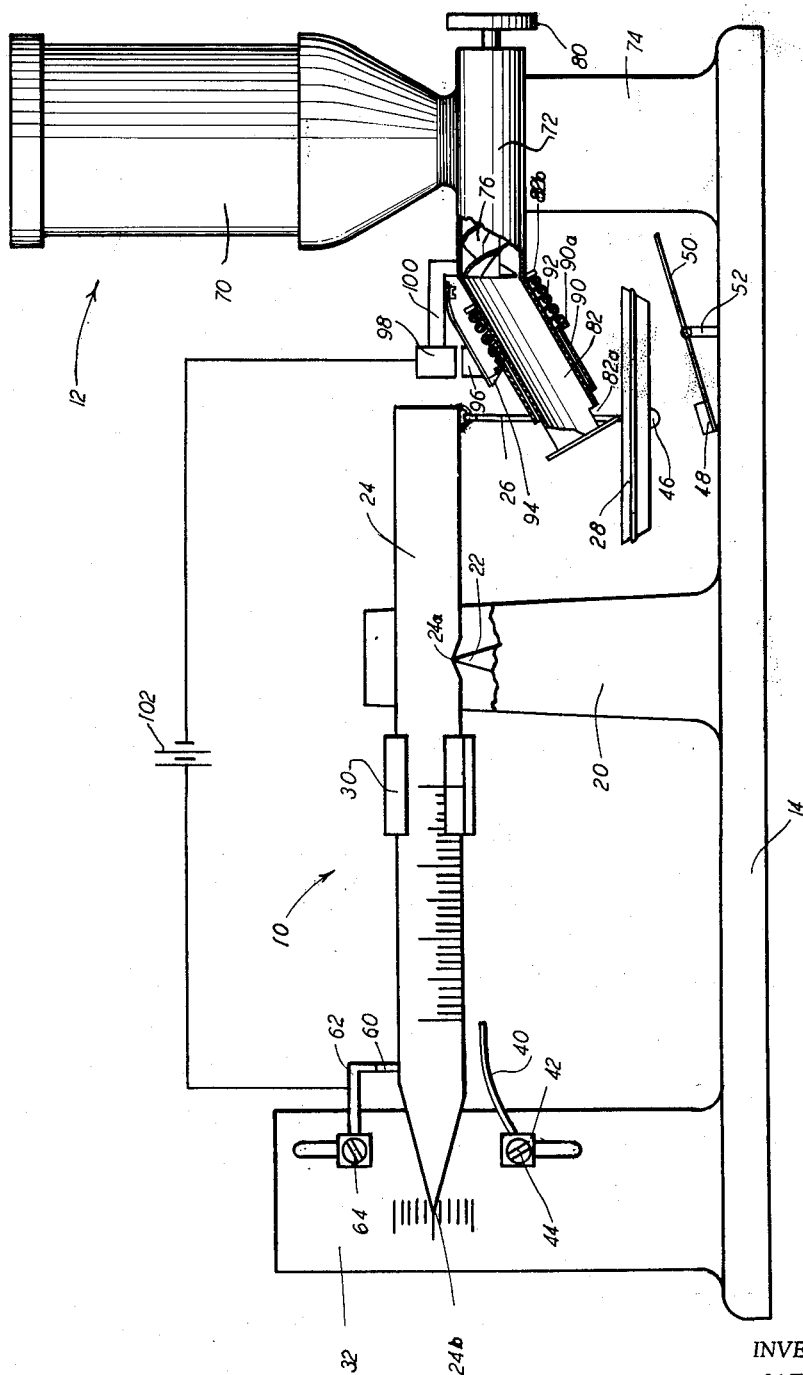
INVENTOR.
THERON C. GIFFORD
BY
Paul B. File
Patent Agent

United States Patent Office 3,193,033
Patented July 6, 1965

3,193,033
MEASURING DISPENSER
Theron C. Gifford, 1804 E. San Antonio, San Jose, Calif.
Filed Dec. 26, 1962, Ser. No. 247,133
1 Claim. (Cl. 177—185)

The present invention relates generally to dispensing apparatus and more particularly to apparatus for dispensing a measured weight of granular material such as gunpowder.

In order to accurately reload a used shell or cartridge with gunpowder, it is necessary that the amount of gunpowder be precisely measured. If too little powder is loaded into the cartridge, ineffective firing results; on the other hand, if too much powder is reloaded into the cartridge, danger both to the firearm and to the shooter arises. Volumetric metering dispensers have been utilized for this purpose but since the gunpowder is a compactible mixture of granules, erroneous results are frequently experienced. On the other hand, if a conventional chemical balance or scale is utilized to measure a precise weight of the powder, the measurement operation becomes time consuming and tedious.

It is a general object of the present invention to provide a measuring dispenser for gunpowder or other granular materials that provides for the rapid dispensing of a precisely metered amount of the material. It is to be expressly understood that while the following descriptive material is directed to the measure dispensing of gunpowder with which the present invention is primarily concerned, the apparatus is equally applicable to the measured dispensing of many other granular mixtures where a precision of results is required.

It is a feature of the present invention to provide a measuring dispenser for gunpowder or the like that provides for the rapid dispensing of the material and a substantially instantaneous cessation of such dispensing when the desired amount has been delivered.

More particularly, it is a feature of the invention to provide a measuring dispenser that incorporates a positive feed for the gunpowder enabling a smooth consistant dispensing of the material.

An additional feature of the invention is the provision of a balance or scale having a pan adapted to receive the dispensed material to afford a weight measurement thereof.

Yet another significant feature of the invention is the provision of valve means actuated in response to movement of the scale or balance to substantially instantaneously stop the flow of gunpowder into the pan or receptacle even though the aforementioned feed means continues to operate.

A related feature of the invention is the provision of an electrical control for energization of the valve means so that closure thereof and cessation of the delivery of gunpowder is substantially instantaneous.

Yet a further feature of the invention is the provision of a measuring dispenser incorporating a balance or scale whose pivoted balance arm is subjected to damping forces to avoid prolonged swinging or oscillation thereof.

These, as well as additional objects and features of the invention will become more apparent from a perusal of the following description of the single figure shown in the accompanying drawing which constitutes a front elevational view of a measuring dispenser embodying the principles of the present invention, certain elements being broken away to illustrate interior details.

Generally, the illustrated apparatus includes two cooperating units, a scale or balance 10 and a powder dispensing unit 12 mounted in appropriate adjacent relationship on a common metal base 14 that rests on any suitable horizontal surface.

More particularly, the scale 10 includes an upright metal standard 20 that rises centrally from the base 14 and carries adjacent its upper end a knife-edge pivot 22 that enters an angular recess 24a in the bottom central portion of a metallic balance arm or beam 24 to provide pivotal support therefor in a more or less conventional fashion.

Adjacent the right end of the balance arm 24, a bracket 26 is pivotally suspended to in turn carry at its lower end a pan 28 that is adapted to receive gunpowder delivered from the aforementioned dispensing unit in a manner to be described in detail hereinafter.

To the left of the knife-edge pivot 22, the balance arm 24 carries a weight 30 for slidable movement therealong and appropriate setting in accordance with suitable cooperating indicia on the weight and on the arm itself. At its left-most extremity, the balance arm 24 is tapered to a point 24b lying adjacent indicia on a post 32 rigidly supported in upright position at the left end of the previously described base 14.

The structure of the scale 10, as thus far described corresponds quite closely to that of conventional chemical scales or balances and, as will be obvious, dependent upon the setting of the slidable weight 30, addition of material to be weighed on the pan 28 will gradually bring the point 24b of the balance arm 24 into centered position with the indicia on the post 32. As illustrated in the drawing, the slidable adjustable weight 30 is positioned at a "zero" position on the balance arm 24 and no material has been added to the pan 28 so that the scale is in balance as indicated by the disposition of the point 24b. As is known by operators of this type of scale or balance, the balance 24 is extremely sensitive and, during a weighing operation, swings or oscillates when material is added to the pan 28 and comes to rest adjacent the indicia on the post 32 only after a rather considerable period of time.

In order to dampen such swinging or oscillation of the balance arm 24, in accordance with one aspect of the present invention, two separate mechanisms can be employed together or as alternatives. One such mechanism is in the form of a simple leaf spring 40 that is mounted on a small bracket 42 that is, in turn, secured in a vertically adjusted position within a vertically extending slot in the post 32 by a suitable screw 44. Vertical adjustment of the bracket 42 in the slot changes the disposition of the free end of the leaf spring 40 below the left end of the balance arm 24 so as to restrict downward movement thereof. Since downward movement of the balance arm 24 is thus restricted, the degree of permissive oscillation of the balance arm is also restricted. As will be obvious, the disposition of the leaf spring 40 is always set below the central or balance position of the balance arm 24, as illustrated.

The second damping mechanism not only restricts oscillations of the balance arm 24, but also lateral swinging of the pan 28, itself and for this purpose, includes a small insert 46 of magnetic material secured centrally to the bottom of the pan 28, which is otherwise composed of non-magnetic material. The magnetic insert 46 is attracted by a small magnet 48 disposed thereunder at one end of a supporting lever arm 50 that is, at its center, pivotally mounted on a pivot 52 secured to the base 14 and can be manually adjusted in its disposition by finger pressure exerted at the remote end thereof. Appropriate manual manipulation of the lever arm 50 will dampen both swinging of the balance arm 24 and lateral swinging of the pan 28 without actual physical contact with the pan, yet when the magnet 48 on the lever arm 50 is released to its inoperative position, as illustrated, no magnetic force will act on the insert 46 and erroneous weighing is thus avoided.

In accordance with an additional aspect of the present invention, the balance arm 24 also mounts one switch contact 60 on the upper left hand end thereof immediately under the end of a second switch contact 62 mounted on a bracket also adjustably secured in a vertical slot in the post 32 by means of another adjustment screw 64, the switch thus formed controlling dispensing of material from the aforementioned powder dispensing unit 12, as will be explained in detail hereinafter.

Such dispensing unit 12 preferably, as illustrated, includes a generally cylindrical hopper 70 with an open upper end to permit supply of gunpowder thereto and a tapered funnel-like lower end that provides for the constant gravity supply of gunpowder into an attached horizontally-disposed cylindrical tube 72 thereunder. Such tube 72 and hopper 70 thereon are rigidly supported above the base 14 at a desired level by a suitable post 74.

A screw auger 76 which projects through one end of the tube and has attached thereto a handle 80 enabling manual actuation of the auger so that powder delivered into the tube from the superposed hopper 70 will be moved from right to left in the tube by appropriate rotation of this handle. Preferably, as illustrated, the auger 76 has a small pitch and the powder is thus delivered at an accurately controllable rate toward the left end of the cylindrical tube 72.

An extension 82 of the tube 72 slopes downwardly to a disposition substantially centrally above the scale pan 28. A small lateral opening 82a in the lower side of the tube extension 82 and adjacent its end enables the powder to be discharged therefrom into the pan 28 as it falls from the hopper 70, thence is pushed through the horizontal tube 72 by the auger 76 and thereafter flows by gravity through the sloping tube extension 82 and ultimately through the opening 82a into the pan 28.

In order to effect immediate cessation of powder delivery into the pan 28 when the desired weight has been delivered thereto, a valve 90 in the form of a sleeve is mounted on the sloping tube extension 82 and is slidable between an open position as illustrated and a lower valve-closing position over the described opening 82a. A coil spring 92 encompasses the tube extension 82 and is mounted under compression between a shoulder 90a at the right end of the sleeve and a fixed shoulder 82b on the outside of the sloping tube extension 82 so as normally to urge the sleeve valve into valve-closing disposition.

In order to maintain the valve 90 in its open disposition, as illustrated, a latch 94 is supported to engage the shoulder 90a on the sleeve, but for valve-releasing motion to a withdrawn position so that the spring 92 may act to quickly move the sleeve valve into valve-closing disposition. The latch 94 is connected to the spring armature 96 of an electromagnet 98 rigidly mounted on a suitable bracket 100 above the cylindrical tube extension 82, one terminal of the electromagnet 98 being grounded to the metallic body of the dispenser 12 and thus through the metallic base 14 to the scale 10 and accordingly to the electrical contact 60 mounted on its balance arm 24. The other electromagnet terminal is connected through a suitable source of electrical power, diagrammatically indicated as a battery 102 in the drawing to the other electrical contact 62 adjustably mounted on the scale post 32. Accordingly, as soon as the balance arm 24 of the scale moves to the "zero" position as illustrated, the contacts 60, 62 of the switch meet, close the electromagnet-energizing circuit which in turn effects movement of the armature 96 and release of the latch 94 so that the sleeve valve 90 may move under the force of the compressed spring 92 into valve-closing position. Thus, even if an operator continued turning the handle 80 attached to the auger 76 so that gunpowder is delivered into the sloping tube extension 82, the sleeve valve 90 is closed and no further material will be delivered into the pan 28. Ultimately then, even though a rapid dispensing of the gunpowder into the pan 28 is being experienced, such dispensing will cease substantially instantaneously when the balance arm 24 comes to the requisite position corresponding to the desired weight of material.

Obviously, structural modifications and/or alterations can be made without departing from the spirit of the present invention, and the structure as shown and described herein is to be considered as purely exemplary and not in a limiting sense. The actual scope of the invention is to be indicated only by reference to the appended claim.

What is claimed is:

In combination with a scale including a pivoted balance arm and a pan suspended from one end of said arm, an arrangement for damping oscillations of said arm and pan which comprises a magnet member attached to the bottom of said pan at its center, and a magnet supported for movement into a position beneath the center of said pan.

References Cited by the Examiner
UNITED STATES PATENTS

| 468,108 | 2/92 | Hunt | 177—185 |
| 502,433 | 8/93 | Gibboney | 177—185 |
| 824,888 | 7/06 | Sundby | 177—76 |
| 2,053,074 | 9/36 | Gattoni | 177—185 |
| 2,260,087 | 10/41 | Neill | 177—76 |
| 2,880,957 | 4/59 | Costello | 177—76 |
| 2,886,302 | 5/59 | Coffman et al. | 177—185 |

LEO SMILOW, *Primary Examiner.*